United States Patent
Leroux et al.

(10) Patent No.: US 10,568,126 B2
(45) Date of Patent: Feb. 18, 2020

(54) METHOD AND APPARATUS FOR DISTRIBUTED UPLINK DATA PROCESSING IN A COMMUNICATION NETWORK WITH LIMITED BACKHAUL

(71) Applicants: Philippe Leroux, Ottawa (CA); Aaron Callard, Ottawa (CA); Amine Maaref, Ottawa (CA)

(72) Inventors: Philippe Leroux, Ottawa (CA); Aaron Callard, Ottawa (CA); Amine Maaref, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 368 days.

(21) Appl. No.: 15/057,544

(22) Filed: Mar. 1, 2016

(65) Prior Publication Data

US 2017/0257881 A1    Sep. 7, 2017

(51) Int. Cl.
*H04W 72/14* (2009.01)
*H04J 11/00* (2006.01)
*H04W 72/04* (2009.01)

(52) U.S. Cl.
CPC ......... *H04W 72/14* (2013.01); *H04J 11/0023* (2013.01); *H04J 11/0059* (2013.01); *H04W 72/0413* (2013.01)

(58) Field of Classification Search
CPC .... H04W 72/085; H04W 48/20; H04W 72/14
See application file for complete search history.

(56) References Cited

U.S. PATENT DOCUMENTS

| 8,411,701 B2 | 4/2013 | Kini et al. | |
|---|---|---|---|
| 2002/0026645 A1* | 2/2002 | Son | H04L 12/2801 725/117 |
| 2002/0080720 A1* | 6/2002 | Pegrum | H04L 47/10 370/236 |
| 2005/0050205 A1* | 3/2005 | Gordy | G06F 13/387 709/227 |

(Continued)

FOREIGN PATENT DOCUMENTS

| CN | 102812744 A | 12/2012 |
|---|---|---|
| CN | 105308999 A | 2/2016 |
| WO | 2015180010 A1 | 12/2015 |

OTHER PUBLICATIONS

International Search Report dated Oct. 26, 2016 for International Patent Application No. PCT/CN2016/081724 filed on May 11, 2016.

(Continued)

*Primary Examiner* — Jael M Ulysse

(57) ABSTRACT

A method and apparatus are provided for handling uplink data traversing a backhaul in a Radio Access Network (RAN). Uplink data received at access nodes of the RAN is processed by processing functions separate from the access nodes. The processing functions provide processed data for use, by further nodes, in decoding of the information transmitted from client devices. Processing can include one or more of: regenerating uplink signals, requantizing signals, and selecting a portion of received data to forward. A scheduler which controls various access nodes and processing functions concurrently with issuance of uplink grants is also provided.

18 Claims, 8 Drawing Sheets

(56) References Cited

U.S. PATENT DOCUMENTS

| | | | | |
|---|---|---|---|---|
| 2005/0213546 A1* | 9/2005 | Reitter | H04W 28/18 | 370/338 |
| 2007/0274256 A1* | 11/2007 | Murai | H04W 72/085 | 370/328 |
| 2008/0205400 A1* | 8/2008 | Ramalho | H04L 47/10 | 370/392 |
| 2009/0042557 A1* | 2/2009 | Vardi | H04W 72/02 | 455/422.1 |
| 2009/0092111 A1* | 4/2009 | Horn | H04W 48/02 | 370/338 |
| 2009/0177941 A1* | 7/2009 | Wager | H04L 1/0061 | 714/752 |
| 2009/0264123 A1* | 10/2009 | Agashe | H04W 48/20 | 455/434 |
| 2010/0046418 A1* | 2/2010 | Horn | H04W 40/22 | 370/315 |
| 2010/0106828 A1* | 4/2010 | Palanki | H04L 1/02 | 709/224 |
| 2010/0110997 A1* | 5/2010 | Erceg | H04W 72/02 | 370/329 |
| 2010/0190447 A1* | 7/2010 | Agrawal | H04W 72/082 | 455/63.1 |
| 2011/0075684 A1* | 3/2011 | Zeng | H04L 1/1861 | 370/475 |
| 2011/0134836 A1* | 6/2011 | Lin | H04W 76/10 | 370/328 |
| 2011/0158340 A1* | 6/2011 | Swanson | H04B 7/022 | 375/267 |
| 2012/0020209 A1* | 1/2012 | Ghosh | H04W 36/22 | 370/230 |
| 2012/0127880 A1* | 5/2012 | Yu | H04W 48/20 | 370/252 |
| 2012/0243513 A1* | 9/2012 | Fujishima | H04W 72/085 | 370/336 |
| 2012/0250604 A1* | 10/2012 | Lindholm | H04B 7/2606 | 370/315 |
| 2012/0329527 A1* | 12/2012 | Kang | H04N 13/0059 | 455/566 |
| 2013/0034043 A1* | 2/2013 | Yu | H04W 72/085 | 370/315 |
| 2013/0090055 A1* | 4/2013 | Pitakdumrongkija | H04B 7/15 | 455/9 |
| 2013/0107823 A1* | 5/2013 | Damnjanovic | H04W 52/16 | 370/329 |
| 2013/0121348 A1* | 5/2013 | Zhang | H04L 29/06 | 370/474 |
| 2013/0215833 A1* | 8/2013 | Ong | H04L 43/0817 | 370/329 |
| 2013/0235724 A1* | 9/2013 | Ashdown | H04L 47/25 | 370/231 |
| 2014/0003391 A1* | 1/2014 | Vesterinen | H04L 47/34 | 370/331 |
| 2014/0016586 A1* | 1/2014 | Khan | H04L 1/0003 | 370/329 |
| 2014/0198781 A1* | 7/2014 | Mademann | H04W 8/082 | 370/338 |
| 2014/0211691 A1* | 7/2014 | Emadzadeh | H04W 64/00 | 370/328 |
| 2014/0286165 A1* | 9/2014 | Chowdhury | H04W 4/028 | 370/235 |
| 2014/0362688 A1* | 12/2014 | Zhang | H04W 72/0486 | 370/230 |
| 2015/0043349 A1* | 2/2015 | Zhu | H04W 48/18 | 370/235 |
| 2015/0110077 A1* | 4/2015 | Lee | H04W 48/20 | 370/332 |
| 2015/0312385 A1* | 10/2015 | Tapia | H04L 69/22 | 370/235 |
| 2015/0358129 A1* | 12/2015 | Ryu | H04L 5/0023 | 455/438 |
| 2016/0066222 A1* | 3/2016 | Makinen | H04W 74/006 | 370/331 |

OTHER PUBLICATIONS

Park, Seok-Hwan, Simeone, Osvaldo, Sahin, Onur and Shamai, Shlomo, Multihop Backhaul Compression for the Uplink of Cloud Radio AccessNetworks, IEEE Transactions on Vehicular Technology, 2016, vol. 65, Issue: 5, pp. 3185-3199, DOI: 10.1109/TVT.2015.2436991, IEEE Journals & Magazines. Prepublished online https://arxiv.org/abs/1312.7135v1(Submitted on Dec. 26, 2013).
ETSI GS NFV-SWA 001 v1.1.1, Dec. 2014, Network Functions Virtualisation (NFV); Virtual Network Functions Architecture.

* cited by examiner

210

Receiving via Network Interface Data Indicative of Information Wirelessly Transmitted from Client Device To Access Node

220

Processing Received Data into Processed Data using Processing Operations

230

Transmitting via Network Interface Processed Data for use by Further Nodes in Backhaul in Decoding of Information from Client Device or Information from Another Client Device

(Scheduler) Generating and Transmitting Uplink Grants to Client Devices

620

(Scheduler) Generating and Transmitting Control Messages to Backhaul Nodes

FIG. 6

METHOD AND APPARATUS FOR DISTRIBUTED UPLINK DATA PROCESSING IN A COMMUNICATION NETWORK WITH LIMITED BACKHAUL

FIELD OF THE INVENTION

The present invention pertains to the field of communication networks and in particular to a method and apparatus for processing of uplink data within the backhaul of the communication network.

BACKGROUND

Communication networks such as Radio Access Networks typically include a set of access nodes connected to each other and other infrastructure, such as Gateway nodes, via a backhaul network. The backhaul typically includes high, but limited, capacity wired, wireless, or optical links. Client devices such as User Equipment (UE) devices communicate with the access nodes, for example wirelessly, and from there access the network via the backhaul. Communication between the client devices and the access nodes is managed at least in part by one or more schedulers.

Capacity of the backhaul network is finite, and therefore network congestion in the backhaul can become a concern, particularly when large numbers of client devices are present and/or client devices may utilize multiple access nodes concurrently. Efficient use of backhaul communication resources can mitigate congestion problems.

Therefore there is a need for a method and apparatus for uplink data processing and decoding within the backhaul of the communication network that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for uplink data processing, such as uplink data decoding, within the backhaul of the communication network. In accordance with embodiments of the present invention, there is provided an apparatus located in a backhaul network, the apparatus comprising a microprocessor, a network interface and a memory and configured to: receive, via the network interface, data indicative of information transmitted from a client device to an access node over a wireless medium, the access node being separate from the apparatus; process the received data into processed data using a first one or more processing operations; and transmit the processed data via the network interface, the processed data for use, by one or more further nodes in the backhaul network, in decoding of the information transmitted from the client device, decoding of information transmitted from another client device over the wireless medium, or a combination thereof.

In accordance with embodiments of the present invention, there is provided a scheduler for a wireless communication network, the scheduler comprising a microprocessor, a network interface and a memory and configured to: generate and transmit uplink grants directing client devices using the wireless communication network to transmit uplink data for reception by access nodes of the wireless communication network; and concurrently generate and transmit control messages to one or more nodes of a backhaul network of the wireless communication network, the control messages directing the one or more nodes to process the uplink data in a manner which is specified in the control messages.

In accordance with embodiments of the present invention, there is provided a method for handling data in a backhaul network, the method comprising: receiving, via a network interface of a network device in the backhaul network, data indicative of information transmitted from a client device to an access node over a wireless medium, the access node being separate from the apparatus; processing, via a microprocessor of the network device, the received data into processed data using a first one or more processing operations; and transmitting, via the network interface, the processed data for use, by one or more further nodes in the backhaul network, in decoding of the information transmitted from the client device, decoding of information transmitted from another client device over the wireless medium, or a combination thereof. Optionally, the received data is indicative of an over-the-air signal transmitted from the client device, and the first one or more processing operations include multiplying the over-the-air signal by a receive vector to obtain a result and quantizing the result. Optionally, the first one or more processing operations include operations which are similar to corresponding operations performed in the client device, including one or more of: adding a header to the received data; fragmenting the received data; regenerating encoded data from decoded data contained in the received data, the processed data comprising the regenerated encoded data; regenerating signals wirelessly transmitted by the client device indicative of decoded data contained in the received data, the processed data comprising the regenerated signals; reencrypting data from decrypted data contained in the received data; and mapping the received data to constellation symbols. Optionally, the processed data is used by the one or more further nodes to perform successive interference cancellation, joint distributed reception, distributed decoding, or a combination thereof. Optionally, the first one or more processing operations comprise decrypting the received data using an encryption key, and the network device is located along or close to a path between the access node and a destination in the backhaul for the information transmitted from the client device. Optionally, the method further includes selecting one of a plurality of approaches for transmitting the processed data, and selecting said one of the plurality of approaches is based at least in part on a cost function which increases with an amount of resources used to transmit the processed data. Optionally, the method further includes receiving control data via the network interface and configuring the first one or more processing operations based on the control data, the control data is a request to provide a particular portion of the received data to a specified node of the backhaul network, the first one or more processing operations include identifying and selecting the particular portion of the received data based on the control data, and the processed data corresponds to the particular portion of the received data, and the received data comprises a plurality of resource blocks, and the portion of the received data corresponds to a subset of the plurality of resource blocks. Optionally, the method further includes receiving control data via the network interface and configuring the first one or more processing operations based on the control data, and at least a portion of the control data is included in a header, the header included in a packet which is received by the network interface and which carries at least a portion of said received data indicative of information transmitted from the client device. Optionally, processing the received data comprises regenerating a signal indicative of the received data by simulating or mimicking a signal generation operation of another apparatus communicatively coupled to the backhaul network, said other apparatus having previously transmitted signals indicative of the received data. Optionally, the method further includes selecting one of a plurality of approaches for transmitting the processed data based at least in part on a cost function which increases with an amount of resources used to transmit the processed data.

In accordance with embodiments of the present invention, there is provided a method for controlling a wireless communication network, the method comprising: generating and transmitting, by a scheduler of the wireless communication network, uplink grants directing client devices using the wireless communication network to transmit uplink data for reception by access nodes of the wireless communication network; and concurrently generating and transmitting, by the scheduler, control messages to one or more nodes of a backhaul network of the wireless communication network, the control messages directing the one or more nodes to process the uplink data in a manner which is specified in the control messages.

BRIEF DESCRIPTION OF THE FIGURES

Further features and advantages of the present invention will become apparent from the following detailed description, taken in combination with the appended drawings, in which:

FIG. 2 illustrates a method for handling data in a backhaul network in accordance with an embodiment of the present invention.

FIG. 6 illustrates method for controlling a wireless communication network, in accordance with an embodiment of the present invention.

It will be noted that throughout the appended drawings, like features are identified by like reference numerals.

DETAILED DESCRIPTION

Embodiments of the present invention are directed toward in-network processing of uplink data at one or more processing nodes in a backhaul network of a communication network, such as a radio access network. The processing nodes are placed at intermediate locations in the backhaul, between: an access node which receives encoded uplink data from client devices; and a destination for the fully decoded uplink data, such as a Gateway. Client devices may be User Equipment (UE) devices, for example, or other devices configured to wirelessly transmit uplink data to the access node, for example as directed by a scheduler. As used herein, the term "UE" is used to refer to any type of client device. The communication capacity of the backhaul is limited, even if this limit is considered to be high by some measures. The processing nodes may coincide with routers of the backhaul network, for example. The uplink data can refer to data which is derived based on signals initially transmitted by the client device in the uplink direction. The uplink data can be modified or processed one or more times, thereby generating one or more versions of the same uplink data.

In accordance with embodiments of the present invention, processing of uplink data at the processing nodes is performed in a manner which tends to increase the efficiency of data transmissions through one or more portions of the backhaul. Some embodiments of the present invention relate to configuration and operation of the processing nodes themselves, and/or configuration of the access nodes. Some embodiments of the present invention relate to a scheduler configured to control the configuration and operation of the processing nodes and/or the access nodes. As such, various signal processing operations, such as uplink signal decoding operations, can be performed in a distributed manner by multiple nodes of the backhaul.

Embodiments of the present invention provide for a processing node, at a location in the backhaul network separate from the access nodes, configured to process and forward uplink data. The uplink data may already be partially processed, for example by an access node or another processing node, and the processing node may further partially process the uplink data. The partial processing may include decoding or re-encoding of the uplink data, for example. The processing node may be provided using real or virtualized computing resources at one or more network node devices in the backhaul network, such as routers.

Figure 1:
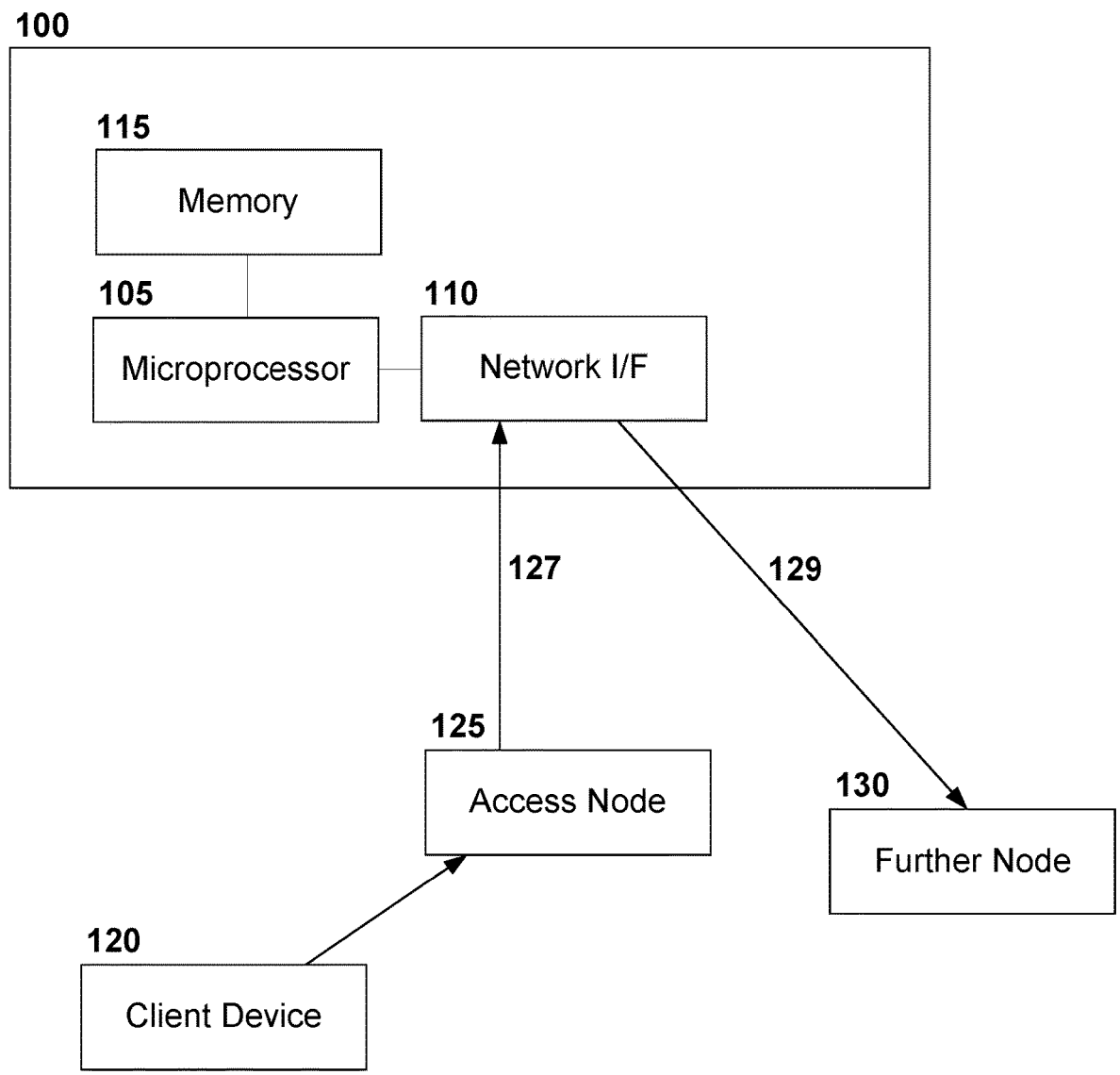
FIG. 1 illustrates an apparatus for handling data in a backhaul network in accordance with an embodiment of the present invention.

Having reference to FIG. 1, embodiments of the present invention provide for an apparatus 100 located in a backhaul network, the apparatus comprising a microprocessor 105, a network interface 110 and a memory 115 holding at least program instructions for execution by the microprocessor. The apparatus may be device in the backhaul network such as router endowed with processing capabilities. The apparatus may be configured as described herein using Network Function Virtualization or similar techniques. The apparatus is configured to receive, via the network interface, data 127 indicative of information transmitted from a client device 120 to an access node 125 over a wireless medium, the access node being separate from the apparatus. The apparatus is further configured to process, at least in part using the microprocessor, the received data into processed data using one or more processing operations. Processing may additionally or alternatively be performed by other components, such as an Application Specific Integrated Circuit (ASIC). The apparatus is further configured to transmit the processed data 129 via the network interface, the processed data for use, by one or more further nodes 130 in the backhaul network, in decoding of the information transmitted from the client device, decoding of information transmitted from another client device over the wireless medium, or a combination thereof. The further nodes can be access nodes or other processing nodes which receive the processed data directly or indirectly from the apparatus. The processed data may be further processed prior to reception by some or all of the further nodes.

Having reference to FIG. 2, embodiments of the present invention provide for a method for handling data in a backhaul network. The method includes receiving 210, via a network interface of a network device in the backhaul network, data indicative of information transmitted from a client device to an access node over a wireless medium, the access node being separate from the apparatus. The method further includes processing 220, via a microprocessor of the network device, the received data into processed data using one or more processing operations. The method further includes transmitting 230, via the network interface, the processed data for use, by one or more further nodes in the backhaul network, in decoding of the information transmitted from the client device, decoding of information transmitted from another client device over the wireless medium, or a combination thereof. In some embodiments, the method includes receiving 215, by the network device from an external controller, instructions indicative of the processing operations to use to process the data by the network device.

Figure 3:
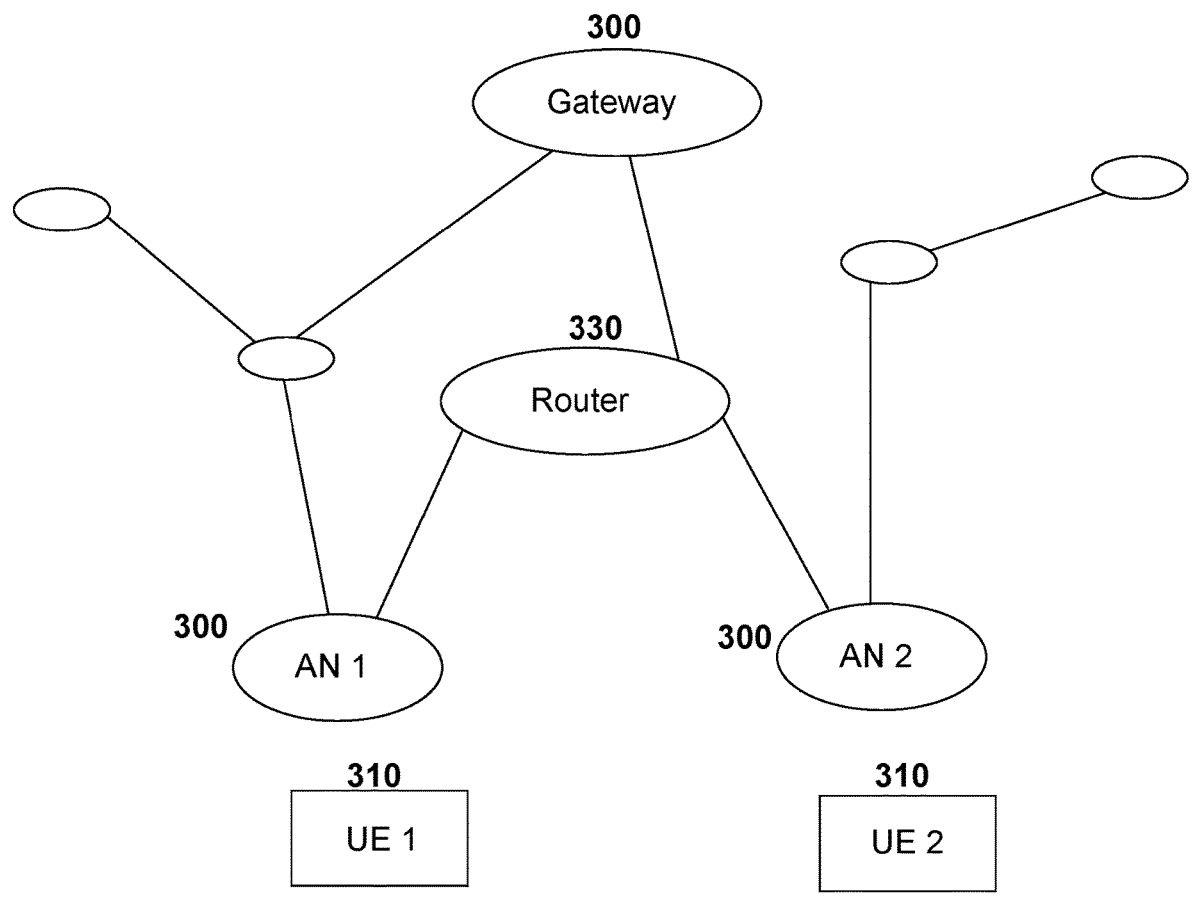
FIG. 3 illustrates a communication network provided in accordance with embodiments of the present invention.

Embodiments of the present invention relate to a communication network configured as follows, and with reference to FIG. 3. The communication network may be a radio access network. One or more access nodes 300 are provided for communicating with UEs 310, including receiving uplink data from the UEs via a wireless medium. The uplink data is propagated through the backhaul portion of the communication network to an indicated destination. The backhaul typically includes high-capacity wired, wireless, or optical links which communicatively couple the access nodes 300 to other nodes, such as other access nodes, and destination nodes such as Gateways 320. It is considered herein that the backhaul capacity is limited, for example while still being larger than the capacities of the access links feeding into the backhaul. The backhaul network can include multiple branches and a potentially complex topology. The backhaul network further includes infrastructure devices such as routers 330. Uplink data can be routed from the access nodes to the destination nodes and/or other access nodes via infrastructure devices of the backhaul.

According to embodiments of the present invention, one or more of the infrastructure devices may be configured as processing nodes. Configuring a device as a processing node may include instantiating a processing function at that device. A processing function may be a Virtual Network Function, for example. Referring to FIG. 3, a processing function can be instantiated or otherwise provided at router 330. Such a processing function is illustrated explicitly in FIG. 4. A microprocessor operatively coupled to memory and located within or near the infrastructure device may be used to carry out operations of the processing function. In some embodiments, the processing function may receive uplink data from a first access node, process the uplink data, and provide the processed data to one or more other nodes, such as a second access node and/or Gateway. Different processed data can be provided by the processing function to different nodes. The processing function may forward the uplink data to some nodes without processing.

When an infrastructure device, such as a router or virtualized router, is instantiated using generic hardware, part of the computing resources of the generic hardware may be used to perform the processing function associated with the infrastructure device. Instantiating devices using generic hardware may be carried out as part of Network Function Virtualization.

According to embodiments of the present invention, the processing function is configured to receive uplink data indicative of information transmitted over a wireless medium, process the data, for example into multiple different data streams, and forward the processed data to other nodes of the communication network. Some or all of the forwarded data may be subsequently used for decoding of the information transmitted over the wireless medium, and/or decoding of other information transmitted over the wireless medium with which the first information has interfered. Interference of information or data may be understood herein as interference of the wireless signals carrying the information or data.

In various embodiments of the present invention, a first type of information indicative of uplink data received at an access node is provided to a first other node of the communication network, and a second type of information indicative of the same uplink data is provided to a second other node. For example, the first type of information may be decoded data held in the uplink data, whereas the second of information may correspond to the uplink data without decoding. As another example, the first and second types of information may be differently quantized versions of the uplink data. Although the first type of information and the second type of information can be redundant in an information theoretic sense, they are not necessarily identical, and thus typical multi-cast techniques cannot be applied. In some embodiments, consumption of communication resources in the backhaul is reduced by exploiting the redundancy between these multiple flows. For example, two flows in the backhaul network can be at least partially merged, such that between a first node and a second node, the two flows are communicated through a portion of the backhaul using a single common flow. Because exploiting this redundancy requires processing, flows may be merged into a common flow and/or split off from a common flow via processing nodes.

In some embodiments, quantization of a received signal may include the following steps: reconstructing multiple quantized signals; multiplying the signal by a receive vector (i.e. combining them using complex weights); and subsequently performing requantization. This process may be repeated using different receive vectors, with the requantized signal sent to different nodes. Local processing, such as FEC decoding, or adaptation of packet labels may also be performed, for example to facilitate locally applied Successive Interference Cancellation (SIC).

In some embodiments, a first data flow is sent carrying information related to multiple dimensions of a signal. These multiple dimensions may represent multiple receive antennas or different users' signals. Encoded together, these multiple dimensions may require less backhaul resources (in overhead and/or processing requirements). At a processing node, the multiple dimensions may be reduced to lower dimensions (for example using a receive vector) in different ways and the results forwarded to different destinations for further processing.

In some embodiments, quantization may be applied to a representation of an over-the-air signal as wirelessly transmitted by a client device. The representation may be generated at the same location as the quantization operation, or at another location. The representation of the over-the-air signal may be generated from a quantized version of the over-the-air signal.

Embodiments of the present invention utilize processing functions in the backhaul to exploit the redundancy between flows. For example, rather than an access node generating two flows which are sent separately to the first and second other nodes, the access node may forward data to an intermediate node having a processing function, and the processing function can generate two flows indicative of the data for sending separately to the first and second other nodes. The distance, in network terms, between the intermediate node and the two other nodes may be less than the distance between the access node and the two other nodes. In embodiments of the present invention, the presence of processing functions may contribute to a reduction in the overall data rate and/or reduction of congestion along various paths in the backhaul.

Embodiments of the present invention employ uplink cooperation schemes which trade off backhaul resources for access link spectral efficiency. Various embodiments relate to joint reception techniques which are employed to facilitate reception from UEs in the access link.

In various embodiments, a broad form of joint reception is considered, in which multiple received versions of the same signal, received at two or more separate antennas, are combined together to decode some information. To decode a signal there are several steps. Following preliminary operations such as antenna reception, power amplification, digitization, channelization, filtering, fast-Fourier transform operations, and the like, the signal is represented as what is referred to herein as "tones." For OFDM the received tone may be represented using the expression:

$$y_1 = H_{11}s_1 + H_{21}s_2 + n.$$

Here, $y_1$ represents the received signal at a first node, $H_{11}$ represents the channel between a first transmitter and a first receiver, and $s_1$ is the transmitted signal from the first transmitter. When attempting to detect and/or decode signal 1 ($s_1$) it is desirable to remove as much of the effect of signal 2 ($s_2$) in the above as possible. This requires a good estimate of what signal 2 is, as well as the channel $H_{21}$.

Embodiments of the present invention focus on cases where the signal $s_2$ is being regenerated or reconstructed from external signals. For example, an external entity may have either correctly decoded the data used to generate $s_2$, or may have generated a good estimate of it ($\hat{S}_2$) through other means, such as the processed received signal from other antennas elsewhere.

In some embodiments, in order for the signal $s_2$ to be correctly regenerated from the highest level payload, several additional pieces of information may be required, such as: the various headers attached; the encryption key; the grant information of the transmitter; redundancy version (RV); and resource information of interest, such as over what resource elements (RE's) a representation of $s_2$ needed. Headers may include Medium Access Control (MAC) headers, Radio Link Control (RLC) headers, and Packet Data Convergence Protocol (PDCP) headers, for example. Grant information may include an indication of resources assigned, such as assigned resource blocks, encoding parameters specified in the grant, and a transport block size (TBS) specified in the grant. With such information, the signal $s_2$ is generated by performing: encapsulation of the signal, for example by adding headers, segmentation of the data indicative of the signal if necessary; encryption of the data; forward error correction encoding of the data; and resource block mapping.

Various embodiments of the present invention focus on how the signal $s_2$ can be regenerated at a desired node in an efficient manner, for example by limiting or minimizing the amount of communication in the backhaul and/or the amount of trust required between nodes.

In some embodiments, the processing function takes in an upper level protocol message, and regenerates lower level protocol packets in the network, for example based at least partially on content of the upper level protocol message. For example, the processing function may take in payload information included in an IP datagram, as well as required side information, and generate lower level MAC datagrams. This action may substantially duplicate processing operations performed within the UE device, prior to transmission over the air, but within the network itself. As such, an upper level protocol message such as a fully decoded IP packet may be used to generate information that can be used to generate an over-the-air signal, such as the signal $s_2$ discussed above, for a particular group of resources. The signal may be indicative of a lower-layer message after encryption has been performed.

In some embodiments, the processing function receives data indicative of an over-the-air signal for a larger set of resources, and forwards a selected subset of the over-the-air signal to a selected destination. For example, a set of ten resource blocks may be received, and a selected subset of the resource blocks, such as two of the set of ten resource blocks, may be forwarded to the destination. In some embodiments, the processing function receives an indication of particular resource blocks, regenerates signals transmitted from the client device over the wireless medium on the particular resource blocks, and forwards the regenerated signals to a specified destination.

In some embodiments, the processing function receives data indicative of an over-the-air signal for a higher-dimensional signal space, applies a receive vector to the over-the-air signal, and quantizes the result of the over-the-air signal after the receive vector has been applied.

Figure 4:
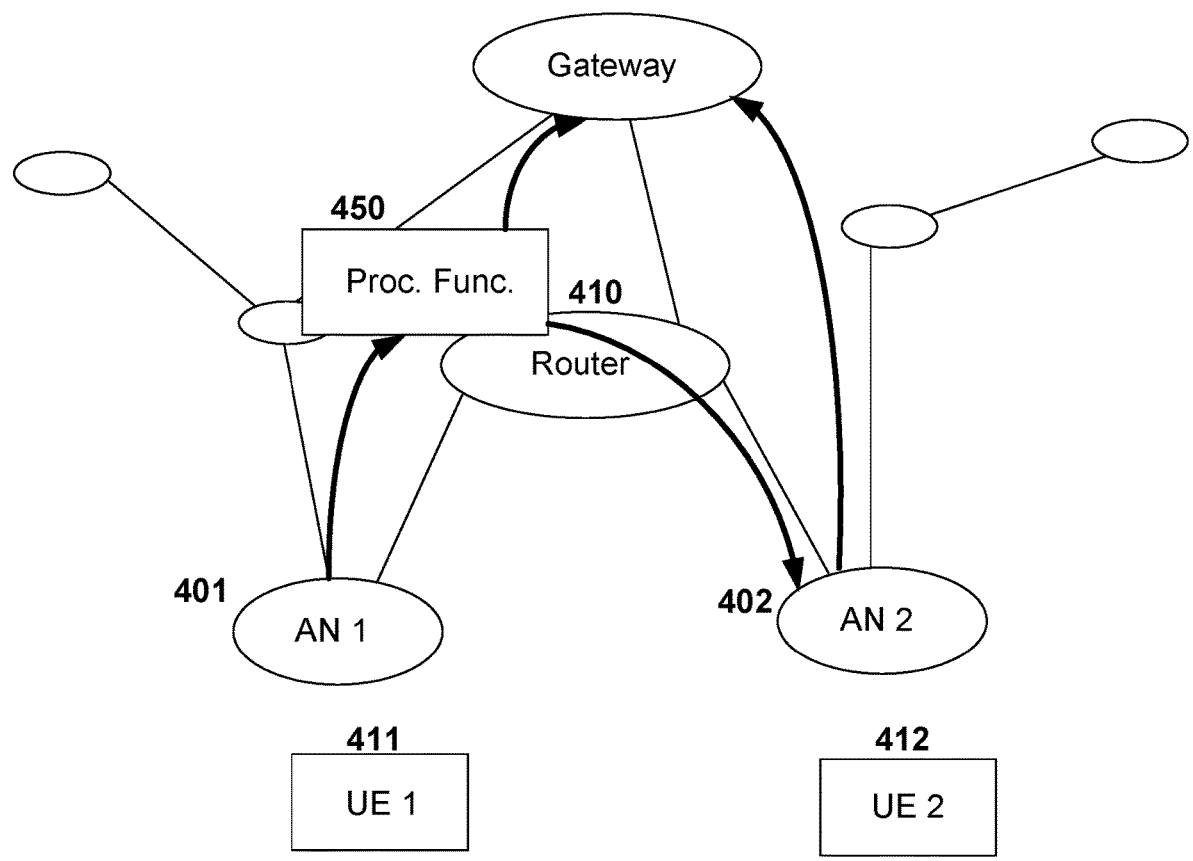
FIG. 4 illustrates a processing function instantiated at a router of a backhaul network in accordance with an embodiment of the present invention.

FIG. 4 illustrates a processing function 450 instantiated at a router 410 of the backhaul network and configured to facilitate SIC in accordance with an embodiment of the present invention. A first signal transmitted from a first UE 411 is received at both a first access node 401 and a second access node 402. A second signal transmitted from a second UE 412 is also received at the second access node 402. Further, the first signal interferes with the second signal at the second access node, and SIC is employed to mitigate this interference. Specifically a representation of the first signal received at the first access node is provided to the second access node. The second access node then regenerates an estimate of the received version of the first signal from the provided data, and subtracts off the regenerated first signal from its own received signal (which includes a combination of the first and second signals) to mitigate the interference.

Conventionally, the first access node transmits a copy of the received low layer symbols (either before or after forward error correction coding) to the second access node. In addition to this, the first access node also transmits a fully processed (i.e. decrypted, decapsulated, etc.) version of the received signal to the gateway.

In the proposed embodiment the processing function 450 is located along the path to the gateway, and receives or intercepts the fully processed version of the data. The processing function then regenerates the low layer version of the data from the processed version and forwards this regenerated data to the second access node. The processing function may hold an encryption key in order to regenerate the encoded data, as well as received additional side information, to the extent necessary for the processing. The encryption key is usable to reencrypt data transmitted by the first UE. As such, one version of the data received by the first access node is transmitted to the router 410, thereby reducing backhaul communication resource usage. Further, the encryption key is kept from the second access node since the second access node does not need to regenerate the encoded data.

In embodiments of the present invention, a processing function instantiated at a node of the backhaul network may be configured to receive: first information indicative of uplink data wirelessly received by a first access node; and control information provided by a second node, such as a second access node or a scheduler. The processing function may then be configured to process the received first information in a manner which is based on the received control information. The processed information may then be forwarded to the second node and/or another node of the backhaul network. In some embodiments, when the second node receives the processed information, the second node may decode further wirelessly received uplink data by using the processed information, for example in accordance with a SIC scheme.

In embodiments of the present invention, processing functions may be instantiated in the network at strategic locations between a controlling scheduler and at least one of the access nodes interoperating with the processing function. As such, rather than the scheduler communicating with the at least one access node, it may be sufficient for the scheduler to communicate with the processing function for control purposes. This may have a benefit of reducing round trip times of communications to and from the scheduler, thereby reducing control latency.

In embodiments of the present invention, the presence of processing functions may mitigate the need to share encryption keys broadly among nodes of the backhaul. For example, when it is required to regenerate encrypted data as part of a SIC operation being performed at an access node, the regeneration may be performed at a processing function rather than at the access node, the regenerated encrypted data then forwarded to the access node. For a given data flow, the processing functions with which encryption keys (capable of reencrypting that data flow) are shared may be located on or close to a path between the origin and destination of the data flow. Embodiments of the present invention comprise determining network locations for processing functions in general and processing functions holding encryption keys in particular. In some embodiments, in relation to the above, encryption and/or decryption of data is performed at nodes at which flows diverge.

In accordance with an embodiment of the present invention, uplink data is at least partially processed at a node which is proximate to the beginning of a path through the backhaul which is to be traversed by the uplink data. For example, the access node which wirelessly receives the uplink data, or a node connected to this access node by a limited number of hops, may perform the processing. As such, the uplink data is processed early, potentially as early as possible. Further, when the less processed representations of the uplink data are required at other nodes, this less processed uplink data can be regenerated from the processed uplink data. The regeneration may be approximate. A node having a processing function which regenerates less or differently processed representations of uplink data may be referred to as a regenerating node. The regenerating node can be limited to backhaul nodes located along or near a path traversed by the uplink data from a source access node to a destination such as a gateway node. Multiple regenerating nodes can be implemented, thereby distributing regeneration of processed data. In the above configuration, the need to propagate less or differently processed data along a first portion of the path traversed by the uplink data can be avoided, since the less or differently processed data is substantially regenerated on demand.

According to embodiments of the present invention, signal regeneration can proceed as follows. A UE having data x to send will generate one or more physical-layer signals $S(x)$ indicative of x using a predictable set of operations. An access node in receipt of signals $S(x)$ is then configured to recover x and transmit a different representation of x, denoted $R(x)$. This representation may for example be an IP datagram. In various embodiments, a processing function may regenerate $S(x)$ from $R(x)$ by: recovering x from $R(x)$, and then simulating or mimicking the operations of the UE to regenerate $S(x)$ from x. The regenerated $S(x)$ can then be used as a surrogate for $S(x)$ for purposes of interference cancellation. More generally, a first device, such as a UE or backhaul node, in receipt of x will generate $S(x)$ in order to forward x. A second device which recovers x, for example from $R(x)$, can regenerate $S(x)$ by simulating or mimicking the operations of the first device.

In accordance with an embodiment of the present invention, uplink data is processed into multiple flows. Different flows are representative of the uplink data in different forms. Processing the uplink data into multiple flows may be performed by a processing function. At least one of the multiple flows is forwarded to a further node and used for decoding purposes. The decoding may involve SIC, for example. In various embodiments, the multiple flows can be characterized as correlated or partially redundant flows, for example two different representations of x, denoted $R_1(x)$ and $R_2(x)$.

In accordance with an embodiment of the present invention, multiple flows are processed into fewer flows. As such, flows may be merged at selected nodes in the backhaul.

In accordance with an embodiment of the present invention, data from separate data streams can be combined into fewer data streams. In some embodiments, a processing function can be configured to derive meta-data from received data and forward the derive meta-data to other nodes of the backhaul. For example, the metadata may be indicative of UE activity or channels strength.

In some embodiments, a processing function is configured to provide feedback to a control entity, such as a scheduler. For example, the feedback may indicate one or more of: current processing load, processing outcomes, decoding success rate, number of bits transmitted, packet delay, packet delay bound failure rate, summary of commands received, processing failures, and suspected causes of processing failures. In some embodiments, the processing function may adapt processing operations based on environmental parameters such as backhaul status. Adaptation may be performed autonomously or upon direction by a control entity.

Embodiments of the present invention provide for a processing function configured as a subselector. The role of the subselector is to limit the transmitted data to only certain selected components which are required by downstream nodes or functions. More advanced version may be configured to receive a request from another node and select, from among a plurality of approaches, a relatively efficient approach for providing data in order to accommodate the request. The subselector may route data through the backhaul in order to satisfy functional requirements. The subselector may additionally process the data based on the functional requirements.

For example, the subselector may receive a request for data usable for interference cancellation applied to a specified resource block, the interference cancellation to be performed at a specified node which can receive data via the subselector. The subselector may also receive decoded data corresponding to transmissions in a time interval containing that resource block. The subselector then selects one of a plurality of ways that the data can be expressed to that node. Possible ways of expressing the data to the node may include: as a portion of an FEC-encoded Transport Block (TB) along with mapping information (if not already available); as the pre-encoded FEC information bits, as well as encoding and mapping information if needed; as a quantized representation of the transmitted symbols (i.e. representing 64 QAM symbols using 4 bits each); and as a quantized representation of the received signal (including the effect of channel, which would be indicated to the subselector). The subselector may then determine and forward, to the specified node, portions of the decoded data which correspond to the specified resource block, in the manner which minimizes resource utilization, while still fulfilling requirements to adequately represent and communicate the data. The manner in which data is forwarded may be selected according to a utility criterion, cost criterion, set of constraints, or a combination thereof. For example, the cost criterion can reflect an expected amount of backhaul resources, such as computation and/or communication resources, taken to express and forward data in a particular manner. The subselector may also filter out particular components of a data stream, and therefore only forward those components of the data stream that are required for a particular task.

In some embodiments, the subselector receives or determines the code rate used to encode data corresponding to the specified resource block. The subselector then determines which of: transmitting the decoded data; and re-encoding the data and transmitting the re-encoded data, is expected to use fewer backhaul resources, such as processing resources, communication resources, or a weighted combination thereof. The subselector then performs the operation which is expected to use fewer backhaul resources.

In some embodiments, the subselector determines what information to transmit. In other embodiments, the subselector receives external control messages indicative of what information to transmit, and is differentiable from a standard processing node in that it supports multiple functions.

Embodiments of the present invention provide for a processing function configured at least in part to facilitate privacy enforcement. Privacy enforcement may include limiting the sharing of encryption keys to certain processing functions in the backhaul.

Embodiments of the present invention provide for remote (i.e. non-localized) control of cooperative decoding scheme implementations. The nodes which make decisions on what to process may be separated from the nodes that perform the processing. This configuration allows for remote nodes to control the actions of processing function nodes. Embodiments of the present invention provide for a scheduler configured to control cooperative decoding scheme implementations.

Embodiments of the present invention facilitate Coordinated Multipoint (CoMP) signal reception, in which a wireless transmission from a terminal is received at several access nodes. The received signal may be jointly processed by the access nodes, and the communication required for such joint processing may be facilitated by the in-network processing functions. In some cases, the processing functions may perform some or all of the CoMP joint processing. The processing functions may facilitate implementation of CoMP without a central decoder and/or using a chaining of decoding steps. At least some of the decoding steps may be performed by the processing functions.

Having reference again to the apparatus illustrated in FIG. 1, some embodiments, the received data includes decoded data, and the first one or more processing operations include regenerating encoded data from the decoded data, the processed data comprising the regenerated encoded data. In some embodiments, the received data includes decrypted data, and the first one or more processing operations includes reencrypting the decrypted data. In some embodiments, the apparatus is further configured to receive further information indicative of one or more specified resources, wherein the first one or more processing operations include regenerating signals transmitted from the client device over the wireless medium on said one or more specified resources. In some embodiments, the received data includes decoded data, and the first one or more processing operations include regenerating signals wirelessly transmitted by the client device indicative of the decoded data, the processed data comprising the regenerated signals. In some embodiments, the processed data comprising the regenerated signals is used by the one or more further nodes to perform joint reception.

Embodiments of the present invention provide for a method and apparatus for controlling processing functions instantiated at backhaul nodes and/or access nodes, decoding functions implemented at access nodes, distributed decoding functions, or a combination thereof. A scheduler may coordinate operations of various processing and/or decoding functions using control messages. The scheduler may be located at a different node than the processing and decoding functions.

Figure 5:
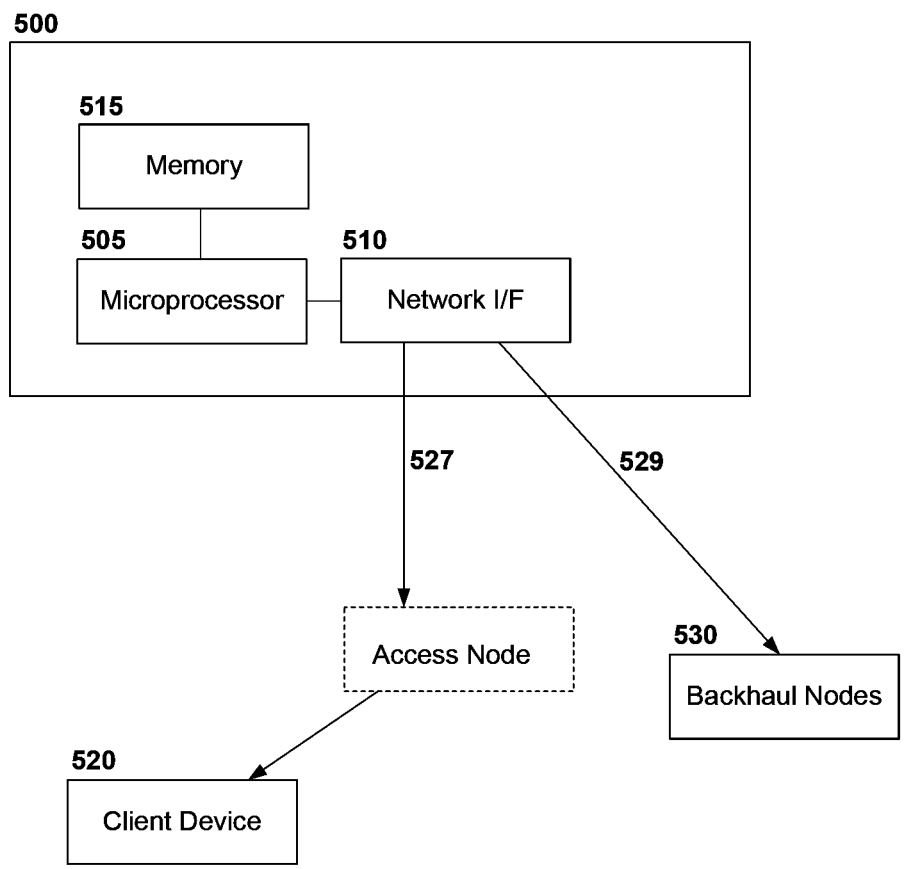
FIG. 5 illustrates a scheduler for a wireless communication network, in accordance with an embodiment of the present invention.

Having reference to FIG. 5, embodiments of the present invention provide for a scheduler 500 for a wireless communication network, the scheduler comprising a microprocessor 505, a network interface 510 and a memory 515 holding at least program instructions for execution by the microprocessor. The scheduler may optionally be provided as described herein using Network Function Virtualization or similar techniques. The scheduler is configured to generate and transmit uplink grants 527 directing client devices 520 using the wireless communication network to transmit uplink data for reception by access nodes of the wireless communication network. The scheduler is further configured, concurrently with the generating and transmitting of uplink grants, to generate and transmit control messages 529 to one or more nodes 530 of a backhaul network of the wireless communication network, the control messages directing the one or more nodes to process the uplink data in a manner which is specified in the control messages. Each grant message may be generated along with an associated control message.

Having reference to FIG. 6, embodiments of the present invention provide for a method for controlling a wireless communication network. The method includes generating and transmitting 610, by a scheduler of the wireless communication network, uplink grants directing client devices using the wireless communication network to transmit uplink data for reception by access nodes of the wireless communication network. The method further includes, concurrently with the generating and transmitting of uplink grants, generating and transmitting 620, by the scheduler, control messages to one or more nodes of a backhaul network of the wireless communication network, the control messages directing the one or more nodes to process the uplink data in a manner which is specified in the control messages.

In embodiments of the present invention, distributed decoding may be provided in which different computing resources, distributed through the backhaul, contribute to the decoding of uplink data received at one or more access nodes. For example, when the access nodes have limited decoding capabilities, each access node may perform limited decoding on associated uplink data. Partially decoded uplink data may be further decoded by other processing functions in the backhaul. Distributed decoding involves sharing of information between decoding functions. This sharing of information is performed intelligently in order to efficiently utilize resources. As such, in embodiments of the present invention, one or more schedulers are configured to coordinate the distributed decoding process by providing the involved decoding and processing functions with instructions.

In some embodiments, a scheduler is configured to generate and transmit control messages to one or more addressed access nodes and/or backhaul nodes holding processing functions. In some embodiments, the control messages, also referred to as control data, include information indicative of a particular instance of uplink data which the addressed node is to monitor for, and information indicative of processed data to be transmitted by the node. The control messages may be transmitted concurrently with grant messages conventionally provided by the scheduler in directing transmission of the uplink data. In particular, when a scheduler provides grant messages directing transmission of uplink data, the scheduler can also provide the associated control messages directing processing of the same uplink data.

The control messages may also include instructions regarding how the addressed controlled node is to react in case of an exception or failure, such as a failure to receive additional data required for decoding uplink data, or failure to decode uplink data.

The control messages may also include instructions regarding how the uplink data is to be processed by the controlled node. Alternatively, the node may determine how to process the data based on the information indicative of processed data to be transmitted by the node.

Figure 7:
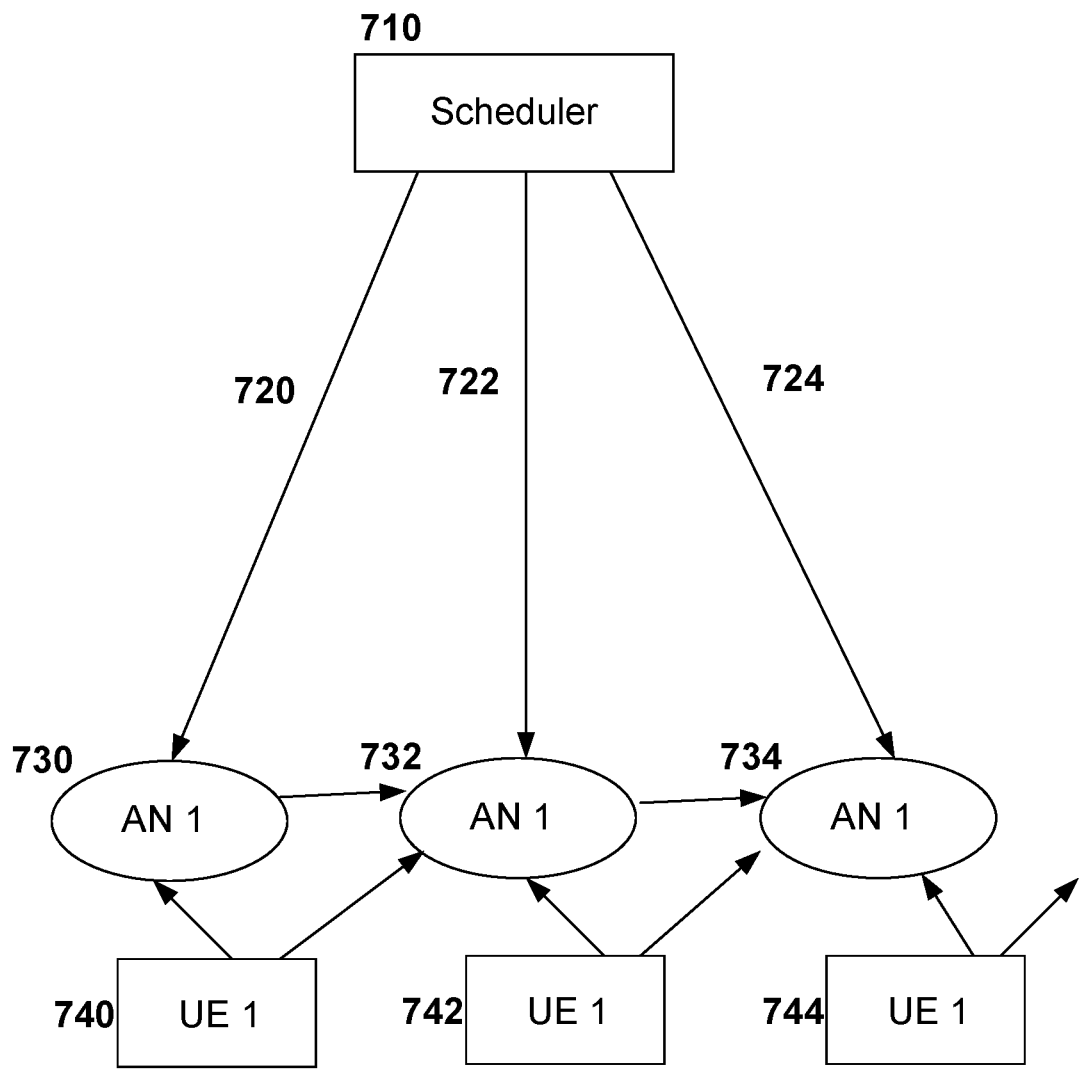
FIG. 7 illustrates scheduler configured to provide control messages to a set of access nodes, in accordance with an embodiment of the present invention.

FIG. 7 illustrates a scheduler 710 configured to provide control messages 720, 722, 724 to a set of access nodes 730, 732, 734. The access nodes receive uplink data from each of a first UE 740, a second UE 742 and a third UE 744, respectively. Further, signals from the first UE may interfere with signals from the second UE at the second access node, and signals from the second UE may interfere with signals from the third UE at the third access node. Embodiments of the present invention may therefore direct the access nodes in implementing SIC to mitigate such interference.

In particular, the first control message 720 may include instructions to monitor the wireless channel for a grant message directed toward the first UE, receive and decode uplink data received from the first UE, and forward the decoded data to the second access node. The second control message 722 may include instructions to wait for the decoded data from the first access node, monitor the wireless uplink channel for a grant message directed toward the second UE, decode uplink data received from the second UE using the received decoded data from the first access node for interference cancellation, and forward the decoded data to the third access node. The third control message 724 may include instructions to wait for the decoded data from the second access node, monitor the wireless uplink channel for a grant message directed toward the third UE, and decode uplink data received from the third UE using the received decoded data from the second access node for interference cancellation. Reception and decoding of uplink data may be configured based on information in the corresponding grant message; as the grant message directs a UE as to how to transmit the uplink data, it also includes information which can be used in receiving and decoding the uplink data.

In embodiments of the present invention, the control messages include a list of operations to be executed sequentially by the addressed node. In some embodiments, the control messages include multiple lists of steps to be executed in parallel. More generally, the control messages may include operating instructions which may include conditional statements, branches, loops, or other programmatic elements. In some embodiments, the control messages include timeouts for each steps, and branches of instructions to execute in the event of a timeout, exception, error or failure.

In some embodiments, addressed nodes in receipt of a control message may be configured to transmit a control message acknowledgement to the scheduler. The acknowledgement may indicate whether operations specified by the control message were successful, or if a failure, exception or error occurred. The acknowledgement may indicate whether other data required by the addressed node for performing the decoding was timely received and/or latency of such other data.

In various embodiments, the control message includes instructions to decode uplink data, re-encode uplink data, regenerate a signal indicative of uplink data, compress uplink data, and/or extract partial information from specified uplink data. In some embodiments, a control message includes instructions directing the addressed node to operate as a specified type of processing node as described elsewhere herein, for example as a requantizer or subselector.

In some embodiments, a control message includes instructions to forward received data and/or data generated by one of the above-described instructed operations to a specified destination.

In some embodiments, a control message includes instructions to add a header or label to a decoded packet of data, the header or label including instructions for use by other nodes in the backhaul to process and/or forward the packet in a particular manner. In some embodiments, a control message includes instructions to multicast the packet to a set of network addresses.

In some embodiments, a control message includes instructions to route the decoded data along a specified path through the backhaul. The specified path may be selected as a path by which the decoded data will be handled differently than if it was transmitted along a default path. The path may include backhaul nodes having processing functions configured to process the decoded data in a particular way. The path may be a Multi-Protocol Label Switching (MPLS) route or tunnel, for example. In some embodiments, the decoded data may be multicast transmitted to one or more gateways, access nodes and/or processing nodes involved in a distributed decoding scheme.

In some embodiments, multicasting of data can be performed in a manner which reduces redundancy of multiple flows in the backhaul. Rather than transmitting multiple forms of the same data from a first node, the first node can transmit a data packet to an intermediate processing function. The intermediate processing function can then multicast the data packet toward multiple destinations. As such, the path from the first node to the multiple destinations includes a first integrated portion comprising the path from the first node to the intermediate processing function. This can reduce data traffic because the first integrated portion is used as a part of multiple data paths. The multiple data paths can carry redundant information, so that the data packet carries at least some data which is conveyed by at least two of the multiple data paths.

In some embodiments, a given node operating as a decoder may be configured, via control messages, to refrain from forwarding all of a given UE's decoded data on to a gateway. Instead, all data from a given UE may be recovered via processing of multiple decoders' forwarded data at the gateway.

In some embodiments, the scheduler is configured to issue grants for a given UE based on grants issued for other UEs. In particular, the grant for the given UE may be timed and configured to make efficient use of generated interference and/or backhaul resources.

In some embodiments, the scheduler, along with informing a UE and access nodes of uplink grants as is conventional in communication systems such as LTE, also informs access nodes of meta-information related to grants and/or control information directing addressed nodes to handle uplink data associated with the grant in a specified manner. The meta-information may be forwarded via the backhaul. Alternatively, the meta-information may be forwarded via the UEs, for example by embedding the meta-information in the grant message, wherein the UE is configured to provide the embedded meta-information back to the access node via the uplink.

Figure 8:
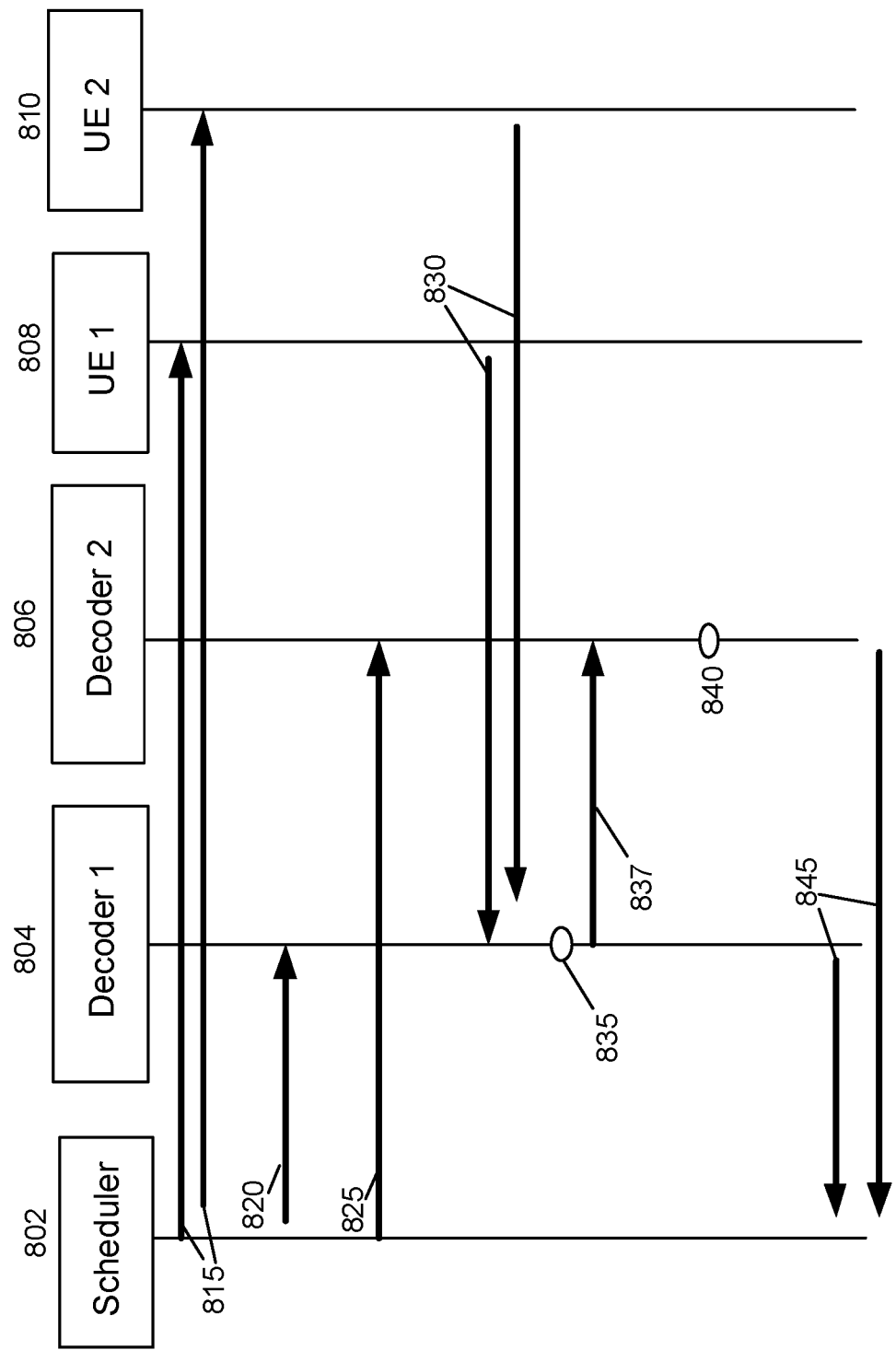
FIG. 8 illustrates cooperative decoding of uplink data controlled by a scheduler, in accordance with an embodiment of the present invention.

FIG. 8 illustrates cooperative decoding of uplink data controlled by a scheduler 802. The cooperative decoding is performed at a combination of a first decoder 804 and a second decoder 806. The uplink data to be decoded is transmitted by a first UE 808 and a second UE 810. As illustrated, the scheduler informs 815 the first UE and the second UE of uplink grants directing transmission of the uplink data. The scheduler also informs 820 the first decoder, via a control message, to decode and forward data received from the first UE to the second decoder. The scheduler also informs 825 the second decoder to wait for said forwarded data from the first decoder prior to decoding uplink data transmitted by the second UE. The first and second UEs transmit 830 their uplink data, which is received at the first and second decoders. The uplink data may interfere, such that at least the second decoder receives a superposition of the uplink data from both UEs. The first decoder then decodes 835 the uplink data from the first UE, forwards the successfully decoded uplink data to a destination gateway, and also forwards 837 an encoded version of the uplink data to the second decoder. Alternatively, the first decoder may forward a decoded version of the uplink data to another node at which a processing function is instantiated, the processing function configured to re-encode the uplink data and forward the re-encoded uplink data to the second decoder. The second decoder, in receipt of the first UE's uplink data as provided via the first decoder, performs decoding 840 of the second UE's uplink data. This decoding may be based on a joint reception operation, including an SIC operation which includes subtracting the first UE's uplink data from the received superposition signal. The first and second decoders inform 845 the scheduler of success or failure of their decoding operations. The first and second decoders may also inform the scheduler as to whether information upon which the decoding is based was received in a timely manner.

Embodiments of the present invention provide for decoding of uplink messages to be adjusted potentially on a per-grant basis. Scheduling and/or decoding dynamics may be decoupled, for example such that, a decoder is configured, at each Transmit Time Interval (TTI) or other specified time interval, to operate based on a grant, and additionally is configured to perform behaviours specified in the grant when decoding the uplink data.

In embodiments of the present invention, use of a scheduler to control decoding operations at other nodes allows complex decisions such as evaluating decodability to be moved from the decoders themselves to the scheduler. The scheduler may direct operations of multiple decoders at different access nodes and/or other infrastructure nodes of the backhaul.

In various embodiments, the scheduler at least partially controls cooperative decoding scheme implementations.

Various methods as disclosed herein may be implemented on one or more real or virtual computing devices, such as devices within a communication network control plane, devices operating in the data plane, or a combination thereof. Computing devices used to implement operations as described herein may include a processor operatively coupled to memory, the memory providing instructions for execution by the processor to perform the method as described herein.

In some embodiments, schedulers, access nodes and/or backhaul nodes can be configured with sufficient functionality to enable the instantiation of an apparatus as described herein on an as-needed basis according to current processing requirements. The apparatus may be realized as virtual network functions (VNFs) within a Network Function Virtualization (NFV) framework. For example, a VNF corresponds to a function enabling operation of a communication network. For example a VNF can provide the functions of a cache, cache controller, router, switch, gateway, firewall, load balancer, server, mobility management entity, and the like. The function is virtualized in the sense that it may utilize a set of virtual resources, such as computing, storage and networking resources, rather than utilizing dedicated hardware resources. As such, VNF may be instantiated on an as-needed basis using available virtual resources. NFV and virtual network functions architecture is described in ETSI GS NFV-SWA 001, for example.

In some embodiments, control messages (control data) indicative of how data is to be processed by a node, such as a processing node, is at embedded in the data to be processed, or contained within data packets also containing the data to be processed. Some or all control data can be communicated in this way. In this scenario a scheduler may, for example, indicate to another node an instruction to attach a header (or similar form of information) to the uplink data to be processed. The other node may be an access node, such as an edge node or eNB. This header would then be read by processing functions in receipt of packets containing the header and uplink data, and those processing functions would apply the processing as needed and instructed. Multiple such instructions may be added in a method similar to source coding. Each processing function may strip the appropriate header, or increment a counter indicating which future functions should be applied.

In some embodiments, the scheduler may use a different control message to instruct the other node to attach the header to the uplink data. Thus, the different control message may include the control data to be included in a header along with the instructions to perform the header inclusion.

In some embodiments the apparatus may comprise software defined networking (SDN) components, or programs deployed on the same or differing device platforms of the communication network. SDN is an architectural framework for creating intelligent programmable networks, where the control planes and the data planes are decoupled, network intelligence and state are logically centralized, and the underlying network infrastructure is abstracted from the application. In embodiments of the present invention, the control plane may use customer information and provide information to form a network logical topology, for example as created via software defined topology (SDT). The SDT can be combined with the SDN and software defined protocol (SDP) to create a customized virtual network (VN). A VN is a collection of resources virtualized for a particular service. Customers include users of services via a UE, terminal, or other customer device. Providers include service providers, VN operators, and other providers of services over the wireless network.

As a separate matter, SDN allows for the management of network services through abstraction of lower-level functionality. Control functions may be separated from forwarding functions for example by controlling the forwarding nodes from a control element. NFV can facilitate the virtualization of entire classes of network node functions. VNF can comprise or operate on one or more virtual machines running on relatively generic servers or computing equipment, such as commercial off-the-shelf hardware capable of being configured to provide a variety of functionalities, as opposed to dedicated hardware for a given functionality.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus located at a processing node in a backhaul network, the apparatus comprising a microprocessor, a network interface and a memory and configured to:

receive, via the network interface, uplink data indicative of a physical layer signal transmitted from a client device to an access node over a wireless medium, the data being generated by extracting payload information from the signal, the access node being separate from the processing node;

process the received data according to one or more processing operations, wherein the one or more processing operations comprise generating, based on the data and by mimicking a signal generation operation of the client device, a representation of the physical layer signal as transmitted from the client device or as received by the access node or another access node over the wireless medium, the one or more processing operations further comprising adding a header to a decoded packet including the uplink data, wherein the header includes instructions for further processing of the decoded packet of uplink data by other nodes in the backhaul network; and transmit output of the one or more processing operations via the network interface toward one or more further nodes in the backhaul network for use thereby in said further processing of the signal transmitted from the client device, further processing of a signal transmitted from another client device over the wireless medium, or a combination thereof.

2. The apparatus of claim 1, wherein the one or more processing operations comprise operations which are similar to corresponding operations performed in the client device, including one or more of: fragmenting the received data; regenerating encoded data from decoded data contained in the received data; reencrypting data from decrypted data contained in the received data; and mapping the received data to constellation symbols.

3. The apparatus of claim 1, further configured to receive control data via the network interface and configure the one or more processing operations based on the control data.

4. The apparatus of claim 3, wherein at least a portion of the control data is included in a further header, the further header included in a packet which is received by the network interface and which carries at least a portion of said received data indicative of the signal transmitted from the client device.

5. The apparatus of claim 3, wherein the control data is a request to provide a particular portion of the received data to a specified node of the backhaul network, wherein the one or more processing operations include identifying and selecting the particular portion of the received data based on the control data, and wherein the output of the one or more processing operations corresponds to the particular portion of the received data.

6. The apparatus of claim 1, wherein the output of the one or more processing operations is used by the one or more further nodes to perform successive interference cancellation, joint distributed reception, distributed decoding, or a combination thereof.

7. The apparatus of claim 1, further configured to select one of a plurality of approaches for transmitting the output of the one or more processing operations, wherein selecting said one of the plurality of approaches is based at least in part on a cost function which increases with an amount of resources used to transmit the output of the one or more processing operations.

8. The apparatus of claim 1, wherein the one or more processing operations support one or more of: decoding the received data; re-encoding the received data; re-compressing the received data; extracting partial information from the received data; quantizing the received data; requantizing the received data; and selecting and transmitting a portion of the received data to a specified destination.

9. A method for handling data in a backhaul network, the method comprising:
receiving, via a network interface of a network device located at a processing node in the backhaul network, uplink data indicative of a physical layer signal transmitted from a client device to an access node over a wireless medium, the data being generated by extracting payload information from the signal, the access node being separate from the processing node;
processing, via a microprocessor of the network device, the received data according to one or more processing operations, wherein the one or more processing operations comprise generating, based on the data and by mimicking a signal generation operation of the client device, a representation of the physical layer signal as transmitted from the client device or as received by the access node or another access node over the wireless medium, the one or more processing operations further comprising adding a header to a decoded packet including the uplink data, wherein the header includes instructions for further processing of the decoded packet of uplink data by other nodes in the backhaul network; and
transmitting, via the network interface, output of the one or more processing operations toward one or more further nodes in the backhaul network for use thereby in said further processing of the signal transmitted from the client device, further processing of a signal transmitted from another client device over the wireless medium, or a combination thereof.

10. The method of claim 9, wherein the received data is indicative of an over-the-air signal transmitted from the client device, and the one or more processing operations further comprise multiplying the over-the-air signal by a receive vector to obtain a result and quantizing the result.

11. The method of claim 9, wherein the one or more processing operations comprise operations which mimic corresponding operations performed in the client device, including one or more of: fragmenting the received data; regenerating encoded data from decoded data contained in the received data, the transmitted output of the one or more processing operations comprising the regenerated encoded data; regenerating signals wirelessly transmitted by the client device indicative of decoded data contained in the received data, the transmitted output of the one or more processing operations comprising the regenerated signals; reencrypting data from decrypted data contained in the received data; and mapping the received data to constellation symbols.

12. The method of claim 9, wherein the output of the one or more processing operations is used by the one or more further nodes to perform successive interference cancellation, joint distributed reception, distributed decoding, or a combination thereof.

13. The method of claim 9, wherein the one or more processing operations further comprise decrypting the received data according to an encryption key, and the network device is located along or close to a path between the access node and a destination in the backhaul for the information transmitted from the client device.

14. The method of claim 9, further comprising selecting one of a plurality of approaches for transmitting the output of the one or more processing operations, wherein selecting said one of the plurality of approaches is based at least in part on a cost function which increases with an amount of resources used to transmit the output of the one or more processing operations.

15. The method of claim 9, further comprising receiving control data via the network interface and configuring the one or more processing operations based on the control data, wherein the control data is a request to provide a particular portion of the received data to a specified node of the backhaul network, the one or more processing operations include identifying and selecting the particular portion of the received data based on the control data, the output of the one or more processing operations corresponds to the particular portion of the received data, the received data comprises a plurality of resource blocks, and the portion of the received data corresponds to a subset of the plurality of resource blocks.

16. The method of claim 9, further comprising receiving control data via the network interface and configuring the one or more processing operations based on the control data, wherein at least a portion of the control data is included in a further header and the further header is included in a packet which is received by the network interface and which carries at least a portion of said received data indicative of information transmitted from the client device.

17. A system comprising:
a client device communicatively coupled to a wireless communication network and configured to transmit a physical layer signal over a wireless medium; and
an apparatus located at a processing node in a backhaul portion of the wireless communication network, the apparatus comprising a microprocessor, a network interface and a memory and configured to:
receive, via the network interface, uplink data indicative of the signal transmitted from the client device to an access node, the data being generated by extracting payload information from the signal, the access node being separate from the processing node;
process the received data according to one or more processing operations, wherein the one or more processing operations comprise generating, based on the data and by mimicking a signal generation operation of the client device, a representation of the physical layer signal as transmitted from the client device or as received by the access node or another access node over the wireless medium, the one or more processing operations further comprising adding a header to a decoded packet including the uplink data, wherein the header includes instructions for further processing of the decoded packet of uplink data by other nodes in the backhaul network; and
transmit output of the one or more processing operations via the network interface toward one or more further nodes in the backhaul network for use thereby in said further processing of the signal transmitted from the client device, further processing of a signal transmitted from another client device over the wireless medium, or a combination thereof.

18. The system of claim 17, further comprising the access node.

* * * * *